(12) United States Patent
Haugstetter

(10) Patent No.: US 10,773,819 B2
(45) Date of Patent: Sep. 15, 2020

(54) FUEL TANK WITH WATER BLADDER

(71) Applicant: Hamilton Sundstrand Corporation, Charlotte, NC (US)

(72) Inventor: Christoph Haugstetter, West Hartford, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 610 days.

(21) Appl. No.: 15/682,183

(22) Filed: Aug. 21, 2017

(65) Prior Publication Data
US 2019/0055030 A1    Feb. 21, 2019

(51) Int. Cl.
*B64D 37/06*    (2006.01)
*B64D 37/10*    (2006.01)
*B60K 11/02*    (2006.01)
*B64D 33/08*    (2006.01)
*F02C 7/143*    (2006.01)
*B64D 13/06*    (2006.01)
*B60K 15/077*    (2006.01)

(52) U.S. Cl.
CPC ............. *B64D 37/06* (2013.01); *B64D 37/10* (2013.01); *B60K 11/02* (2013.01); *B60K 2015/0777* (2013.01); *B64D 13/06* (2013.01); *B64D 33/08* (2013.01); *B64D 2013/0662* (2013.01); *B64D 2013/0674* (2013.01); *F02C 7/1435* (2013.01)

(58) Field of Classification Search
CPC ............. B64D 2033/024; B64D 37/06; F17C 2201/018; F17C 2201/0185
See application file for complete search history.

(56) References Cited

U.S. PATENT DOCUMENTS

| 3,933,448 A | 1/1976 | Peri |
| 5,402,967 A | 4/1995 | Hughes |
| 6,755,219 B1 * | 6/2004 | Bolle .................... B01J 7/02 |
| | | 141/100 |

(Continued)

FOREIGN PATENT DOCUMENTS

| DE | 2443126 A1 | 3/1976 |
| EP | 2135805 A2 | 12/2009 |

(Continued)

OTHER PUBLICATIONS

Search Report dated Dec. 16, 2019 in U310979EPD, EP Application No. 19194778.7, 7 pages.

(Continued)

*Primary Examiner* — Philip J Bonzell
*Assistant Examiner* — Michael B. Kreiner
(74) *Attorney, Agent, or Firm* — Cantor Colburn LLP

(57) ABSTRACT

A tank assembly is provided and includes a housing which has a housing volume and which is chargeable with a volume of a first fluid, a bladder disposed within the housing and chargeable with a second fluid such that the bladder has a minimal volume in an uncharged state and a flow system. The flow system includes a portion thereof which is coupled to the bladder and which has a second volume within the housing. The flow system is configured to at least charge the bladder with a volume of the second fluid which is equal to or less than a difference between the housing volume less a sum of the minimal volume and the second volume and the volume of the first fluid.

19 Claims, 4 Drawing Sheets

(56) References Cited

U.S. PATENT DOCUMENTS

| 6,854,688 | B2 | | 2/2005 | McElroy et al. | |
|---|---|---|---|---|---|
| 9,527,593 | B2 | | 12/2016 | Andres | |
| 10,488,117 | B1 | * | 11/2019 | Haugstetter | F28D 7/0066 |
| 2017/0292459 | A1 | * | 10/2017 | Carpenter | F02C 3/04 |
| 2019/0071187 | A1 | * | 3/2019 | Kozar | B64D 37/06 |
| 2020/0023291 | A1 | * | 1/2020 | Merat | B01D 17/02 |

FOREIGN PATENT DOCUMENTS

| EP | 2853430 A2 | 4/2015 |
|---|---|---|
| JP | 2003137197 A | 5/2003 |

OTHER PUBLICATIONS

Search Report dated Dec. 20, 2018 in U310979EP, EP Application No. 18179076.7, 7 pages.

* cited by examiner

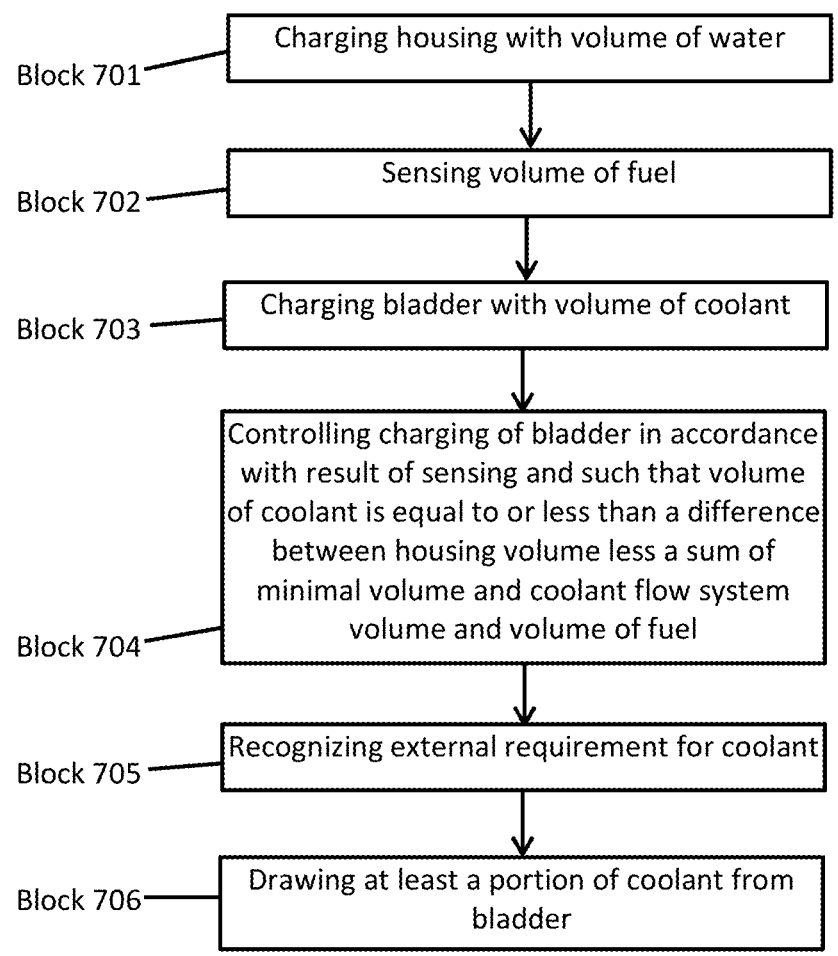

FUEL TANK WITH WATER BLADDER

STATEMENT OF FEDERAL SUPPORT

This invention was made with Government support under contract number FA8650-16-D-2617 awarded by the Department of the Air Force. The Government has certain rights in the invention.

BACKGROUND

The following description relates to fuel tanks and, more specifically, to a fuel tank with a water bladder inserted therein for peak thermal management.

Condensed water that is collected in a water separator component of an aircraft while the aircraft is at lower altitudes is often sprayed on a front face of a heat exchanger immediately upon the condensed water being collected. It has been found, however, that there are instances in which this condensed water could be more beneficially used at a later point of a flight mission. For example, instead of spraying condensed water immediately on the front face of the heat exchanger, the condensed water could be collected and used at a later time such as during aircraft climb conditions when heat rejection is more challenging.

Such storage of condensed water presents a challenge since dedicating space on an aircraft for condensed water storage can be unattractive, given that this volume then won't be available for other uses anymore.

BRIEF DESCRIPTION

According to an aspect of the disclosure, a tank assembly is provided and includes a housing which has a housing volume and which is chargeable with a volume of a first fluid, a bladder disposed within the housing and chargeable with a second fluid such that the bladder has a minimal volume in an uncharged state and a flow system. The flow system includes a portion thereof which is coupled to the bladder and which has a second volume within the housing. The flow system is configured to at least charge the bladder with a volume of the second fluid which is equal to or less than a difference between the housing volume less a sum of the minimal volume and the second volume and the volume of the first fluid.

In accordance with additional or alternative embodiments, the first fluid includes fuel and the second fluid includes coolant.

In accordance with additional or alternative embodiments, the tank assembly further includes a first fluid system by which the first fluid is charged into and drawn from the housing.

In accordance with additional or alternative embodiments, the housing volume is one of constant and variable.

In accordance with additional or alternative embodiments, the second fluid includes water supplied to the flow system from a source.

In accordance with additional or alternative embodiments, the tank assembly further includes a controller configured to sense the volume of the first fluid and to control the flow system accordingly.

In accordance with additional or alternative embodiments, the controller is further configured to control the flow system to draw at least a portion of the volume of the second fluid from the bladder and the housing based on an external requirement.

In accordance with additional or alternative embodiments, the controller includes a sensing element.

In accordance with additional or alternative embodiments, the flow system includes inlet and outlet pipes which are respectively fluidly communicative with the bladder and flow control elements respectively disposed along the inlet and outlet pipes and respectively controllable to control a flow of the second fluid through the inlet and outlet pipes.

According to another aspect of the disclosure, an aircraft is provided and includes an engine, a water separation component in which coolant condenses, a housing which has a housing volume and which is chargeable with a volume of fuel for use in the engine, a bladder disposed within the housing and chargeable with the coolant such that the bladder has a minimal volume in an uncharged state and a coolant flow system. The coolant flow system includes a portion thereof which is coupled to the bladder and which has a second volume within the housing. The coolant flow system is configured to at least charge the bladder with a volume of the coolant drawn from the water separation component. The volume of the coolant is equal to or less than a difference between the housing volume less a sum of the minimal volume and the second volume and the volume of the fuel.

In accordance with additional or alternative embodiments, the aircraft further includes a fuel system by which the fuel is charged into and drawn from the housing.

In accordance with additional or alternative embodiments, the aircraft further includes a compressor and a heat exchanger of an air cycle machine (ACM) which are receptive of a portion of the volume of the coolant via the coolant flow system.

In accordance with additional or alternative embodiments, the housing volume is one of constant and variable.

In accordance with additional or alternative embodiments, the aircraft further includes a controller configured to sense the volume of the fuel and to control the coolant flow system accordingly.

In accordance with additional or alternative embodiments, the controller is further configured to control the coolant flow system to draw at least a portion of the volume of the coolant from the bladder and the housing based on an external requirement.

In accordance with additional or alternative embodiments, the controller includes a sensing element.

In accordance with additional or alternative embodiments, the coolant flow system includes inlet and outlet pipes which are respectively fluidly communicative with the bladder and flow control elements respectively disposed along the inlet and outlet pipes and respectively controllable to control a flow of the second fluid through the inlet and outlet pipes.

According to yet another aspect of the disclosure, a method of controlling a tank assembly of a vehicle is provided. The vehicle includes a housing having a housing volume, a bladder that has a minimal volume in an uncharged state disposed within the housing and a coolant flow system coupled to the bladder and having a coolant flow system volume within the housing. The method includes charging the housing with a volume of fuel, charging the bladder with a volume of coolant and controlling the charging of the bladder with the volume of the coolant such that the volume of the coolant is equal to or less than a difference between the housing volume less a sum of the minimal volume and the coolant flow system volume and the volume of the fuel.

In accordance with additional or alternative embodiments, the method further includes sensing the volume of the fuel and controlling the flow system in accordance with a result of the sensing.

In accordance with additional or alternative embodiments, the method further includes recognizing an external requirement for the coolant exists and controlling the flow system to draw at least a portion of the volume of the coolant from the bladder and the housing based on the external requirement.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 7 is a flow diagram illustrating a method of operating a fuel tank assembly in accordance with embodiments.

DETAILED DESCRIPTION

Figure 1:
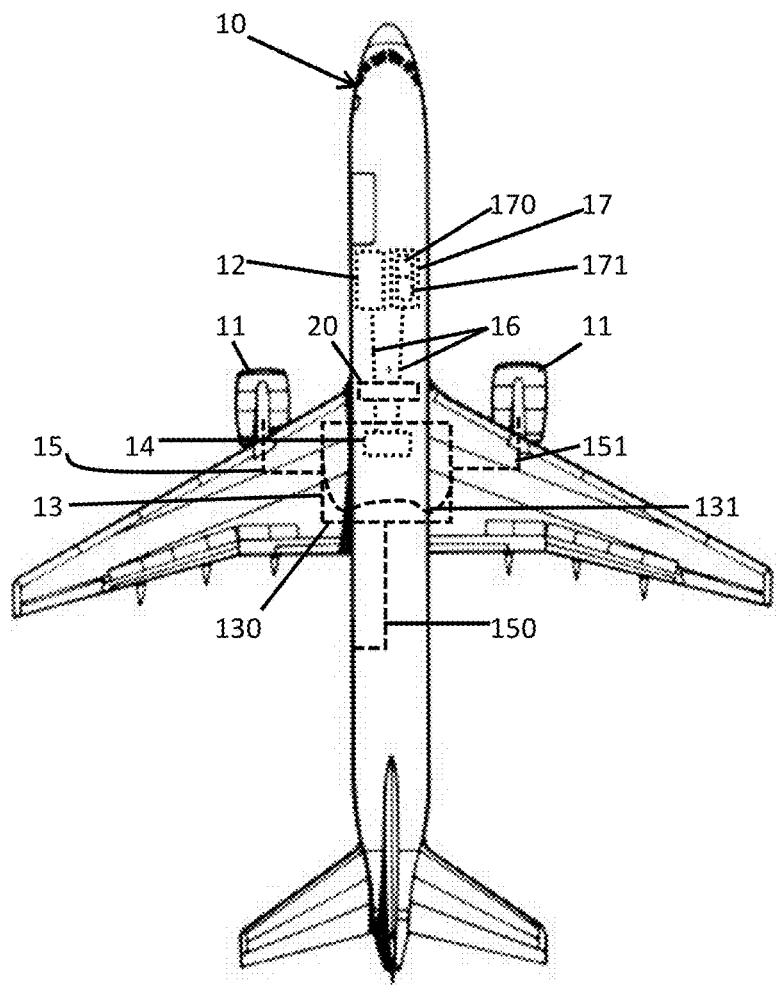
FIG. 1 is an illustration of an aircraft in accordance with embodiments.

Thus, as will be described below, an architecture for thermal management of systems of an aircraft is provided in order to address the challenges of dealing with the large amount of heat generated during different flight phases and use scenarios without violating system and component constraints. The architecture is designed based on the understanding that, at certain times, excess cooling capacity exists but that there may be a deficit of cooling capacity at certain other times. The architecture thus provides for storage of coolant within a limited but available volume of space on an aircraft and without requiring a separate rigid tank. This is accomplished within the architecture by way of a flexible bladder that is disposed to store coolant, such as condensed water, and which is disposed inside a fuel tank. As the fuel tank gets emptied, since the volume of the fuel tank remains constant, the bladder can be charge with a volume of coolant for storage therein.

With reference to FIGS. 1-4, an aircraft 10 is provided. The aircraft 10 includes an engine 11, a water separation component 12 in which coolant is condensed under certain conditions, a fuel tank housing 13 and a bladder 14. The fuel tank housing 13 has a housing volume and is chargeable with a volume of fuel for use in the engine 11 by way of a fuel system 15. The bladder 14 is disposed within the fuel tank housing 13 and is chargeable with the coolant. The bladder 14 has a minimal volume in an uncharged state (see FIG. 3) and can be charged with coolant up to a maximum volume (see FIG. 4). The housing volume may be constant as in the case of the fuel tank housing 13 being provided as a rigid fuel tank housing 130 or variable as in the case of the fuel tank housing 13 being provided as an inflatable fuel tank housing 131. In any case, the maximum volume of the bladder 14 may be less than the housing volume. The fuel system 15 includes a first portion 150 by which the fuel tank housing 13 is charged with fuel (from, e.g., an external fuel tanker while the aircraft 10 is grounded) and a second portion 151 by which fuel is drawn from the fuel tank housing 13 and delivered to the engine 11.

The aircraft 10 may further include a coolant flow system 16 and an air cycle machine (ACM) 17. The coolant flow system 16 includes a portion 160 (see FIGS. 3 and 4 and FIGS. 5 and 6) thereof which is coupled to the bladder 14 and which has a coolant flow system volume within the fuel tank housing 13. The coolant flow system 16 is configured to at least charge the bladder 14 with a volume of the coolant drawn from the water separation component 12. The ACM 17 includes a compressor 170 and a heat exchanger 171 (see FIGS. 3 and 4 and FIGS. 5 and 6) which are each receptive of a portion of the volume of the coolant from the bladder 14 via the coolant flow system 16.

It is to be understood that, while the embodiments described herein relate to the aircraft 10, other embodiments exist in which the aircraft 10 can be replaced by another type of a vehicle. This vehicle may be primary ground-based or flight ready. Thus, it is to be further understood that the descriptions relating to the aircraft 10 are not limited to that case and are provided alone only for purposes of clarity and brevity and do not limit the scope of the application as a whole in any way. Moreover, while the fuel tank housing 13 has been described above as being provided as either a rigid fuel tank housing 130 or an inflatable fuel tank housing 131, the following descriptions will relate only to the case of the fuel tank housing 13 being provided as the rigid fuel tank housing 130. Again, this is being done for purposes of clarity and brevity and do not limit the scope of the application as a whole in any way.

Figure 2:
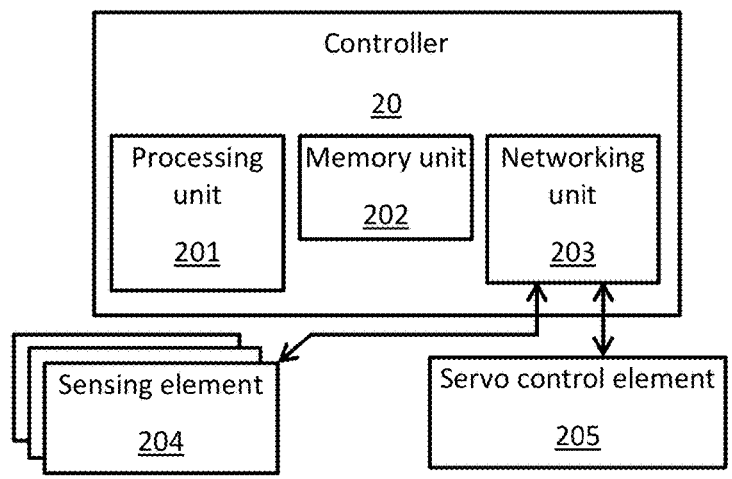
FIG. 2 is a schematic illustration of a controller of the aircraft of FIG. 1.

With continued reference to FIGS. 1-4, the volume of the coolant which is charged into the bladder 14 is generally equal to or less than a difference between the housing volume of the fuel tank housing 13 less a sum of the minimal volume of the bladder 14 in the uncharged state and the coolant flow system volume of the portion 160 of the coolant flow system 16 that is within the fuel tank housing 13 and the volume of the fuel that is within the fuel tank housing 13 at any given time. To this end, as shown in FIGS. 1 and 2, the aircraft 10 may further include a controller 20. The controller 20 is configured to sense or estimate the volume of the fuel within the fuel tank housing 13 and to control the coolant flow system 16 according to a result of the sensing and based on the minimal volume of the bladder 14 and the volume of the portion 160 of the coolant flow system 16 that is within the fuel tank housing 13, both of which are known. The controller 20 is further configured to control the coolant flow system 16 to draw at least a portion of the volume of the coolant from the bladder 14 and the fuel tank housing 13 based on an external requirement. This external requirement may be, for example, a requirement for coolant of the compressor 170 and the heat exchanger 171 of the ACM 17.

As shown in FIG. 2, the controller 20 may include a processing unit 201, a memory unit 202, a networking unit 203, an optional sensing element 204 to sense the volume of the fuel in the fuel tank housing 13 at any given time and a servo control element 205. The controller 20 may be provided as a flight computer for the aircraft 10 or as a stand-alone component. The processing unit 201 may be provided as a central processing unit (CPU), which is coupled with the memory unit 202 and is communicative with the sensing element 204 and the servo control element 205 by way of the networking unit 203. The memory unit 202 has the minimal volume of the bladder 14 and the volume of the portion 160 of the coolant flow system 16 that is within the fuel tank housing 13 stored thereon in one or more first storage units and has executable instructions stored thereon in one or more second storage units. When executed, the executable instructions cause the processing unit to operate as described herein.

The sensing element 204 may be provided as one or more sensors that may be provided in at least one or more of the fuel tank housing 13 and the fuel system 15. As such, the sensing element 204 may be provided as one or more of a pressure sensor and a flow sensor to sense the volume of the fuel within the fuel tank housing 13 directly or indirectly, to periodically generate readings of the volume of the fuel within the fuel tank housing 13 and to issue signals to the processing unit 201 via the networking unit 203 based on the readings. The servo control element 205 may be coupled directly or indirectly to first and second flow control elements 30 and 31 of the coolant flow system 16 (to be described below) and is receptive of commands from the processing unit 201 via the networking unit 203 by which the servo control element 205 controls various operations of the first and second flow control elements 30 and 31.

Figure 3:
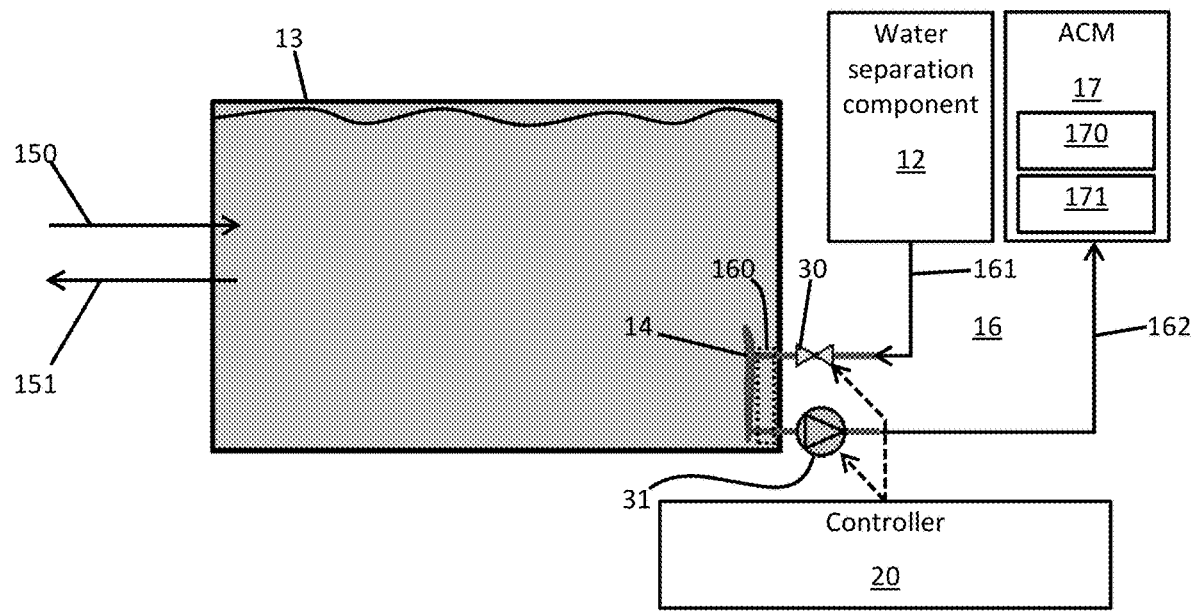
FIG. 3 is a schematic illustration of a fuel tank assembly at an initial operational state in accordance with embodiments.
Figure 4:
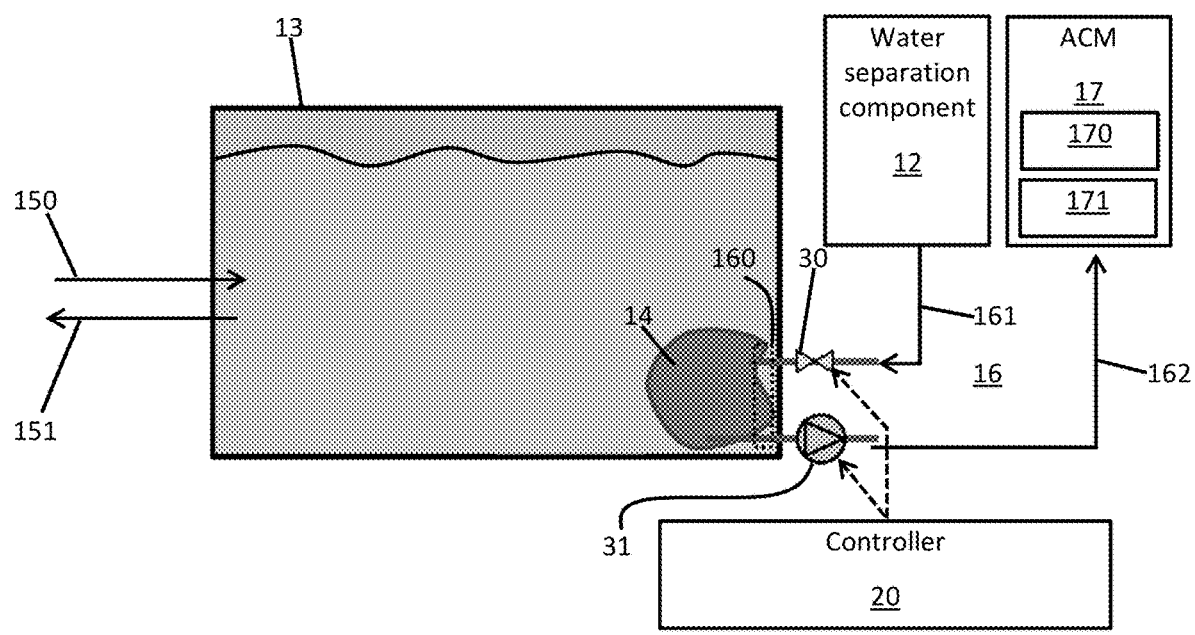
FIG. 4 is a schematic illustration of a fuel tank assembly at an intermediate operational state in accordance with embodiments.

As shown in FIGS. 3 and 4 (and FIGS. 5 and 6), the coolant flow system 16 includes an inlet pipe 161, an outlet pipe 162, the first flow control element 30 and the second flow control element 31. The inlet pipe 161 extends from at least the water separation component 12 at an exterior of the fuel tank housing 13, into the fuel tank housing 13 and to the bladder 14. The outlet pipe 162 extends from the bladder 14, out of the fuel tank housing 13 and to the compressor 170 and the heat exchanger 171 of the ACM 17. The inlet and outlet pipes 161 and 162 are thus fluidly communicative with the bladder 14 and the respective sections of the inlet and outlet pipes which are disposed within the fuel tank housing 13 form the above-noted portion 160 of the coolant flow system 16. The first flow control element 30 is disposed along the inlet pipe 161 at an exterior of the fuel tank housing 13 or within the fuel tank housing 13 and is controllable by, for example, the servo control element 205 to control a flow of the coolant into the fuel tank housing 13 and, more particularly, the bladder 14. The second flow control element 31 is disposed along the outlet pipe 162 at an exterior of the fuel tank housing 13 or within the fuel tank housing 13 and is controllable by, for example, the servo control element 205 (see FIG. 2) to control a flow of the coolant out of the fuel tank housing 13 and, more particularly, the bladder 14.

Operations of the various features described above will now be described with further reference to FIGS. 3-6.

As shown in FIG. 3, at an initial time or a beginning of a flight mission of the aircraft 10, the fuel tank housing 13 is charged with mission-appropriate amount of fuel within the housing volume. Meanwhile, the bladder 14 is typically in the uncharged state (but optionally also already pre-charged if desirable by anticipated mission/space allowances) and thus takes up the minimal volume within the housing volume. The portion 160 of the coolant flow system 16 that is within the housing volume similarly takes up the volume of the portion 160. At this point, controller 20 may control the first flow control element 30 prevent or allow a flow of coolant into the bladder 14 and may control the second flow control element 31 to prevent any flow of coolant from the bladder 14.

As shown in FIG. 4, while the aircraft 10 idles on the ground, taxis or is flying at low altitude, the engine 11 is run and the fuel is beginning to be slowly spent so that volume within the housing volume starts to become available. Meanwhile, humidity at or near the ground results in water (e.g., condensed water) being collected in the water separation component 12 and, instead of this water being used immediately as in conventional systems, the water is stored in the bladder 14. This is accomplished by the controller 20 controlling the first flow control element 30 to allow a flow of water into the bladder 14 while controlling the second flow control element 31 to prevent a flow of the water from the bladder 14. This results in the bladder inflating by a volume that is equal to or less than the volume of the spent fuel which has been drawn out of the housing volume.

Figure 5:
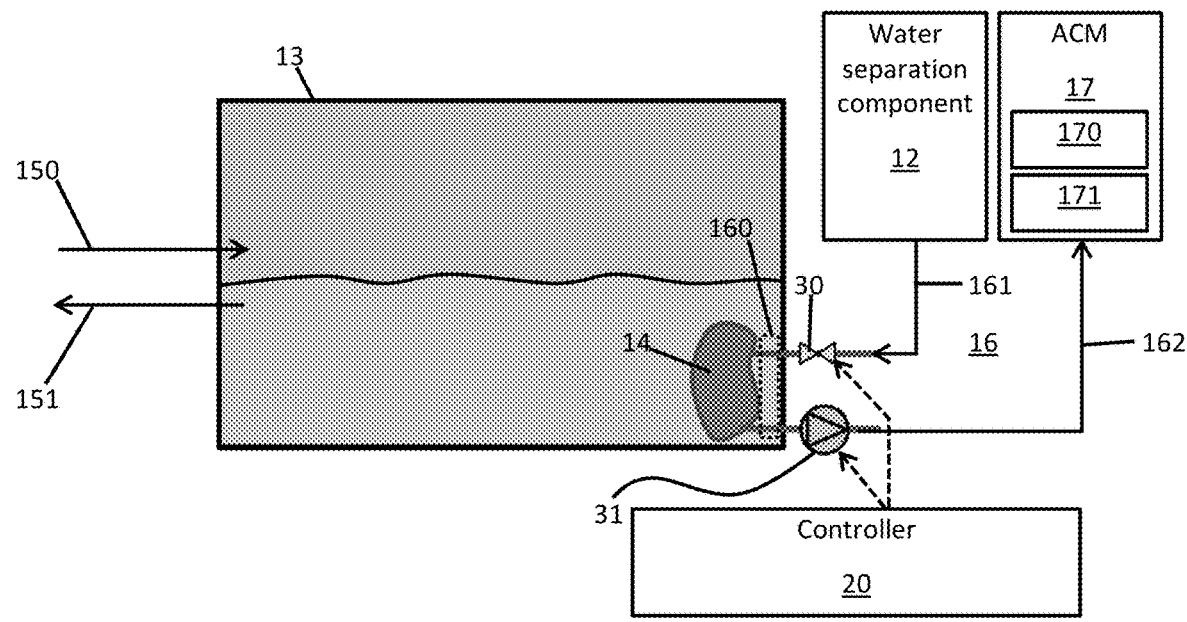
FIG. 5 is a schematic illustration of a fuel tank assembly at an intermediate operational state in accordance with embodiments.

As shown in FIG. 5, while the aircraft 10 is in a high power mode during climbing operations or combat (in the case of a fighter jet), engine temperatures and/or thermal loads increase substantially in relatively short amounts of time and water is pumped out of the bladder 14 in order to support cooling in various systems such as environmental cooling systems and the ACM 17 even while the fuel is spent. In such cases, the controller 20 may control the first flow control element 30 to prevent a flow of water into the bladder 14 and may control the second flow control element 31 to allow a flow of the water from the bladder 14. This results in the bladder deflating and, in some cases, deflating as a substantially increased rate as compared to its inflation rate (i.e., bladder 14 inflation may require hours versus minutes during which the bladder 14 can be deflated). At this point, the controller 20 may control the first and second flow control elements 30 to allow or prevent flows of water relative to the bladder 14 but may, in particular, control the second flow control element 31 to allow a flow of water from the bladder 14 to the environmental cooling systems and the ACM 17 in order to save power during final minutes of flight time.

Figure 6:
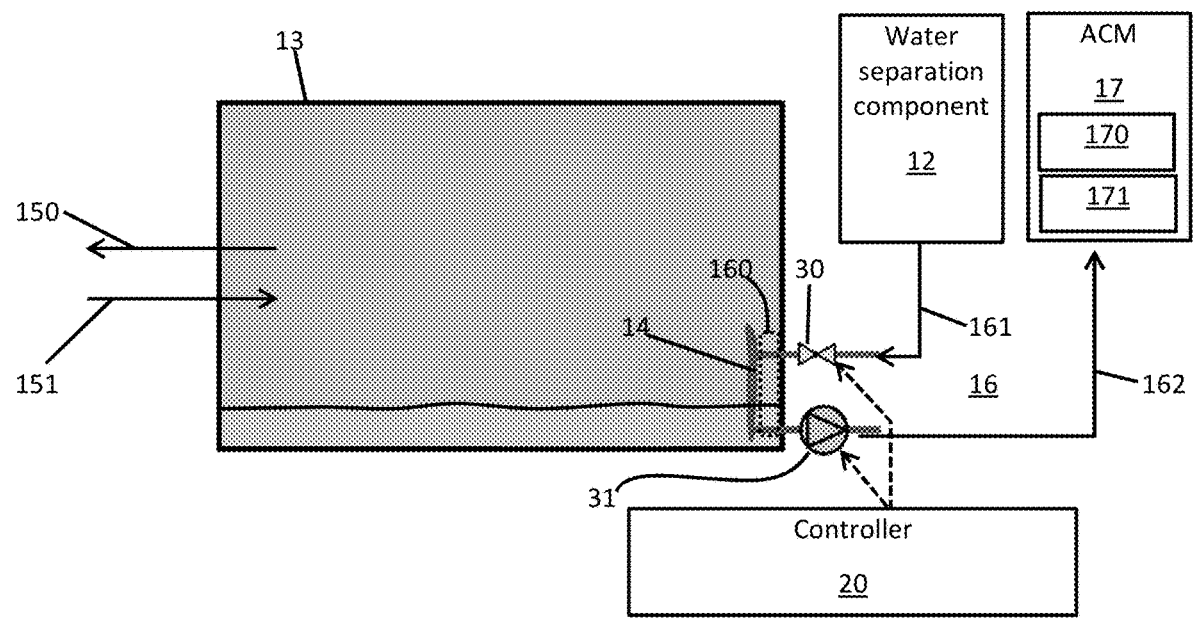
FIG. 6 is a schematic illustration of a fuel tank assembly at a late operational state in accordance with embodiments.

As shown in FIG. 6, at an end of a flight mission when fuel is all or mostly used up and the aircraft 10 returns to the ground, the bladder 14 may be returned to its minimal volume.

With reference to FIG. 7, a method of controlling a tank assembly of a vehicle is provided. The vehicle may be configured as a ground-based or flight vehicle, such as the aircraft 10 described above. As shown in FIG. 7, the method includes charging the housing with a volume of fuel (block 701), sensing the volume of the fuel (block 702), charging the bladder with a volume of coolant (block 703) and controlling the charging of the bladder with the volume of the coolant in accordance with a result of the sensing/estimating such that the volume of the coolant is equal to or less than a difference between the housing volume less a sum of the minimal volume and the coolant flow system volume and the volume of the fuel (block 704). The method may further include recognizing an external requirement for the coolant exists (block 705) and controlling the flow system to draw at least a portion of the volume of the coolant from the bladder and the housing based on the external requirement (block 706).

In accordance with alternative embodiments, if a planned mission is such that the entire fuel tank does not need to be filled (e.g., flight time is short enough or in-air refueling is planned), the bladder 14 might be filled on the ground. Also, collected water might come from other sources besides those described above (e.g., from condensation of other air-conditioning equipment or water collecting mechanism, such as rain collectors). In addition, water or coolant usage strategy may vary and could include helping to suppress temperatures inside the engine 11 or other aircraft 10 systems.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A tank assembly, comprising:
   a housing which has a housing volume and which is chargeable with a volume of a first fluid;
   a bladder disposed within the housing and chargeable with a second fluid such that the bladder has a minimal volume in an uncharged state; and
   a flow system comprising a portion thereof which is coupled to the bladder and which has a second volume within the housing,
   the flow system being configured to at least charge the bladder with a volume of the second fluid which is equal to or less than a difference between the housing volume less a sum of the minimal volume and the second volume and the volume of the first fluid;
   wherein the first fluid comprises fuel and the second fluid comprises coolant.

2. The tank assembly according to claim 1, further comprising a first fluid system by which the first fluid is charged into and drawn from the housing.

3. The tank assembly according to claim 1, wherein the housing volume is one of constant and variable.

4. The tank assembly according to claim 1, wherein the second fluid comprises water supplied to the flow system from a source.

5. The tank assembly according to claim 1, further comprising a controller configured to sense the volume of the first fluid and to control the flow system accordingly.

6. The tank assembly according to claim 5, wherein the controller is further configured to control the flow system to draw at least a portion of the volume of the second fluid from the bladder and the housing based on an external requirement.

7. The tank assembly according to claim 5, wherein the controller comprises a sensing element.

8. The tank assembly according to claim 1, wherein the flow system comprises:
   inlet and outlet pipes which are respectively fluidly communicative with the bladder; and
   flow control elements respectively disposed along the inlet and outlet pipes and respectively controllable to control a flow of the second fluid through the inlet and outlet pipes.

9. An aircraft, comprising:
   an engine;
   a water separation component in which coolant condenses;
   a housing which has a housing volume and which is chargeable with a volume of fuel for use in the engine;
   a bladder disposed within the housing and chargeable with the coolant such that the bladder has a minimal volume in an uncharged state; and
   a coolant flow system comprising a portion thereof which is coupled to the bladder and which has a second volume within the housing,
   the coolant flow system being configured to at least charge the bladder with a volume of the coolant drawn from the water separation component,
   the volume of the coolant being equal to or less than a difference between the housing volume less a sum of the minimal volume and the second volume and the volume of the fuel.

10. The aircraft according to claim 9, further comprising a fuel system by which the fuel is charged into and drawn from the housing.

11. The aircraft according to claim 9, further comprising a compressor and a heat exchanger of an air cycle machine (ACM) which are receptive of a portion of the volume of the coolant via the coolant flow system.

12. The aircraft according to claim 9, wherein the housing volume is one of constant and variable.

13. The aircraft according to claim 9, further comprising a controller configured to sense the volume of the fuel and to control the coolant flow system accordingly.

14. The aircraft according to claim 13, wherein the controller is further configured to control the coolant flow system to draw at least a portion of the volume of the coolant from the bladder and the housing based on an external requirement.

15. The aircraft according to claim 13, wherein the controller comprises a sensing element.

16. The aircraft according to claim 9, wherein the coolant flow system comprises:
   inlet and outlet pipes which are respectively fluidly communicative with the bladder; and
   flow control elements respectively disposed along the inlet and outlet pipes and respectively controllable to control a flow of the second fluid through the inlet and outlet pipes.

17. A method of controlling a tank assembly of a vehicle, the vehicle comprising:
   a housing having a housing volume;
   a bladder that has a minimal volume in an uncharged state disposed within the housing; and
   a coolant flow system coupled to the bladder and having a coolant flow system volume within the housing,
   the method comprising:
   charging the housing with a volume of fuel;
   charging the bladder with a volume of coolant; and
   controlling the charging of the bladder with the volume of the coolant such that the volume of the coolant is equal to or less than a difference between the housing volume less a sum of the minimal volume and the coolant flow system volume and the volume of the fuel.

18. The method according to claim 17, further comprising:
   sensing the volume of the fuel; and
   controlling the flow system in accordance with a result of the sensing.

19. The method according to claim 17, further comprising:

recognizing an external requirement for the coolant exists; and controlling the flow system to draw at least a portion of the volume of the coolant from the bladder and the housing based on the external requirement.

\* \* \* \* \*